United States Patent [19]
Grover

[11] Patent Number: 5,848,139
[45] Date of Patent: Dec. 8, 1998

[54] TELECOMMUNICATION TRAFFIC PRICING CONTROL SYSTEM

[75] Inventor: Wayne D. Grover, Edmonton, Canada

[73] Assignee: Telecommunications Research Laboratories, Edmonton, Canada

[21] Appl. No.: 753,002

[22] Filed: Nov. 19, 1996

[51] Int. Cl.⁶ .................................................. H04M 15/00
[52] U.S. Cl. ........................ 379/114; 379/137; 379/134
[58] Field of Search ................................... 379/111, 112, 379/113, 114, 115, 121, 122, 127, 133, 134, 135, 136, 137, 93.01

[56] References Cited

U.S. PATENT DOCUMENTS

| | | | |
|---|---|---|---|
| 4,207,598 | 6/1980 | Reich et al. | 379/93.01 |
| 5,163,042 | 11/1992 | Ochiai | 379/113 |
| 5,335,268 | 8/1994 | Kelly, Jr. et al. | 379/112 |
| 5,488,655 | 1/1996 | Hamlen | 379/137 |

OTHER PUBLICATIONS

Application of fuzzy logic to electricity pricing in a deregulated environment, M.G. Dondo, M.E. El–Hawary, in Proc. IEEE Can. Conf. Elect. and Computer Engineering, Calgary, May, 1996, pp. 388–391.

System Concept, Econometric Modelling, and Fuzzy Logic Controller for a Proposed Class of Delay–Tolerant Variably–Priced Network Services, W.D. Grover, J.S. Hayer, TR Labs, 22 pages, submitted for publication, but unpublished as of May 2, 1997.

Competition, Convergence, and Customer Choice—Finding New Paths to the Customer, by Rod Taylor, IEEE Canadian Review—Spring 1996, pp. 5–8.

Power Pool of Alberta Began Operation on Jan. 1, 1996, 18 pages. At least as early as May 1996.

Power Pool of Alberta Brochure, 4 pages, Not earlier than Jan. 1, 1996, but before filing of application.

Grid Company of Alberta Inc., 4 pages, Jan. 1, 1996, Not earlier than Jan. 1, 1996, but before filing of application.

Feasibility, Protocols and Benefits of a Real–time Bandwidth Auction Service: A new ISDN based application, W.D. Grover, 1990, 6 pages, unpublished research proposal.

A System Wide Approach to Forecast the Demand for Business Toll Services, Malcolm Mung, International Journal of Forecasting 4 (1988) 535–544, pp. 535–544.

Transport Auction: A New Service Concept, Issue II, Dec. 13, 1990, W.D. Grover, 7 pages, unpublished research proposal.

Fuzzy logic works with degrees of truth, David L. Brubaker, Mar. 1, 1991, Computer Design, 2 pages.

Stimulated Traffic Influence on Trunk Group Provisioning Base Load, Lansun Lee, AGT Limited, Canada, undated, 6 pages.

Some simple analytics of peak–lad pricing, Ted Bergstrom and Jeffrey K. MacKie–Mason, RAND Journal of Economics, vol. 22, No. 2, Summer 1991, pp. 241–249.

Modelling The Interactions Between New Telecommunications Services, M.H. Lyons, BT Laboratories, Martlesham Heath, IPSWICH, UK, Apr., 1992, 12 pages.

Abstract of U.S. Patent No. 4,654,867, Mar. 31, 1987, Labedz, et. al, 3 pages.

Abstract of U.S. Patent No. 5,280,630, Jan. 18, 1994, Wang, 2 pages.

Abstract of U.S. Patent No. 3,935,394, Jan. 27, 1976, Bulfer, 3 pages.

Abstract of U.S. Patent No. 5,502,714, Mar. 26, 1996, Sallberg, 3 pages.

M. Eng. Report of J. Hayer, unpublished.

*Primary Examiner*—Paul Loomis
*Attorney, Agent, or Firm*—Anthony R. Lambert

[57] ABSTRACT

Delay-tolerant calls access slack capacity in a telecommunications network under variable pricing controlled by the network so as to permit the network to pick up or stimulate background traffic loads as and when desired to gain revenue from background idle capacity.

5 Claims, 2 Drawing Sheets

TELECOMMUNICATION TRAFFIC PRICING CONTROL SYSTEM

FIELD OF THE INVENTION

This invention relates to control and pricing of telecommunication traffic.

BACKGROUND OF THE INVENTION

Telephone companies have traditionally sought to stimulate demand through tariff reductions in off-peak hours. However, fixed-discounting schedules are not adaptive to the actual hourly and daily changes in calling patterns in response to unpredictable diurnal, cultural, or seasonal events. They also risk having the unanticipated effect of overstimulation of demand which can threaten network performance objectives. Fixed discount schedules are also not specific to individual routes or trunk groups and rely for their revenue effectiveness on a single accurate overall assessment of price elasticity. And yet the supply-demand curve most likely varies across origin-destination pairs and through time considerably. It is also slow and costly to effect and publicize changes to a fixed discounting scheme. Conventional fixed discount schemes also apply to the basic calling services which must be given a guaranteed grade of service.

The economic principle of spot pricing based on current demand and supply conditions has been previously studied by Vickrey for public utilities such as electricity, telephone, water supply which usually have a rigid price structure. Spot pricing has also been studied for some time in the power industry. As Dondo and El-Hawary have explained, however, "In spot pricing of electricity, the objective is to maximize the producer and consumers' social welfare. To maximize this welfare function, the price for consumption of electricity should be based on the actual cost incurred in supplying power to the consumer". Other work on dynamic pricing for electrical power aims to reduce peak demand by shifting some usage into non-peak times. But variable pricing in power applications is different from the telecommunications market. In the power system there is really no equivalent to the use of slack capacity that exists in telecom networks. Excess generating capacity may exist but it is not without significant cost to use this excess, i.e., fuel must be burned or reservoirs depleted. In contrast, using the 'background capacity' of an installed operating telecom network is almost totally without additional cost for the use of the excess transport itself. New costs will arise only in the infrastructure to support new forms of access to this slack capacity. Variable pricing in the power industry is primarily a generation not transport issue. In the telecommunications industry, transport itself is the commodity and the users are the generators.

For long distance telephone service Vickrey also suggested that the price should be set such that it equals the short run marginal cost of the call, i.e., the cost to the other users of the system in terms of their increased blocking, the aim being to vary price in such a way that the blocking would remain at a low and constant level. But this is essentially a load-levelling use of adaptive pricing that would be applied to all traffic.

In the power industry, a Power Pool scheme is known that facilitates variable pricing to match supply offers from private (non-utility) generating companies to large-user price bids. Suppliers and users register as members of the Power Pool. Pool bidders are either large industrial consumers or aggregations of smaller individual users.

SUMMARY OF THE INVENTION

The inventors propose real time-variable pricing of slack capacity on selected trunk routes. While traditional volume stimulation schemes are focused on the low-blocking foreground traffic, the inventor proposes a new class of "background" traffic applications that can accept and exploit the time-varying slack capacity not used by the foreground conventional services. Such applications receive as available service only. The supply for this market is the time-varying capacity on each trunk group that is not currently needed to meet the network's obligation to provide the target blocking levels for foreground on-demand tariff-priced calling.

According to one aspect of the invention, there is provided a telecommunication traffic pricing and control system for a telecommunication network that includes at least one trunk group and a local access switch for providing access to each trunk group for plural subscribers, the telecommunication traffic pricing and control system comprising:

means to measure slack capacity on the trunk group and provide a signal representative of slack capacity on the trunk group;

a price controller having as input the slack capacity signal for generating a price to subscribers for use of the slack capacity by delay tolerant calls; and a first subscriber agent responsive to the price set by the price controller for generating a request for service to the local access switch for a delay tolerant call when the price for the delay tolerant call meets conditions set by the subscriber.

Preferably, the price controller implements a pricing strategy that is dependent on past changes in telecommunications traffic volume on the trunk group and past changes in price of delay tolerant calls, and preferably implements a set of fuzzy logic rules. The subscriber agent may aggregate data from plural other subscriber agents, and store it in a storage system.

These and other aspects of the invention are described in the detailed description of the invention and claimed in the claims that follow.

BRIEF DESCRIPTION OF THE DRAWINGS

There will now be described preferred embodiments of the invention, with reference to the drawing, by way of illustration only and not with the intention of limiting the scope of the invention, in which like numerals denote like elements and in which.

DETAILED DESCRIPTION OF PREFERRED EMBODIMENTS

In switched public networks the design busy hour levels of traffic occur on only a fraction of the yearly and daily traffic cycles, and traffic growth only nominally meets the design provisioning levels at the end of the provisioning forecast period. In a trunk group that is operating at design limits, there is considerable slack capacity in real trunking networks. The background capacity at design limits exists only in the form of idle time segments dispersed randomly over the trunks of the group. But, at off peak times, whole numbers of trunks may be effectively diverted for other uses without affecting the 1% g.o.s. guarantee for foreground traffic. In this invention, the idle time of the trunk groups is offered to subscribers with delay tolerant calls. Delay tolerant calls include: updates of large Internet routing tables, remote site database backups, and dissemination of newsgroup updates. The information packet associated with a delay tolerant call will be referred to as payload.

Figure 1:
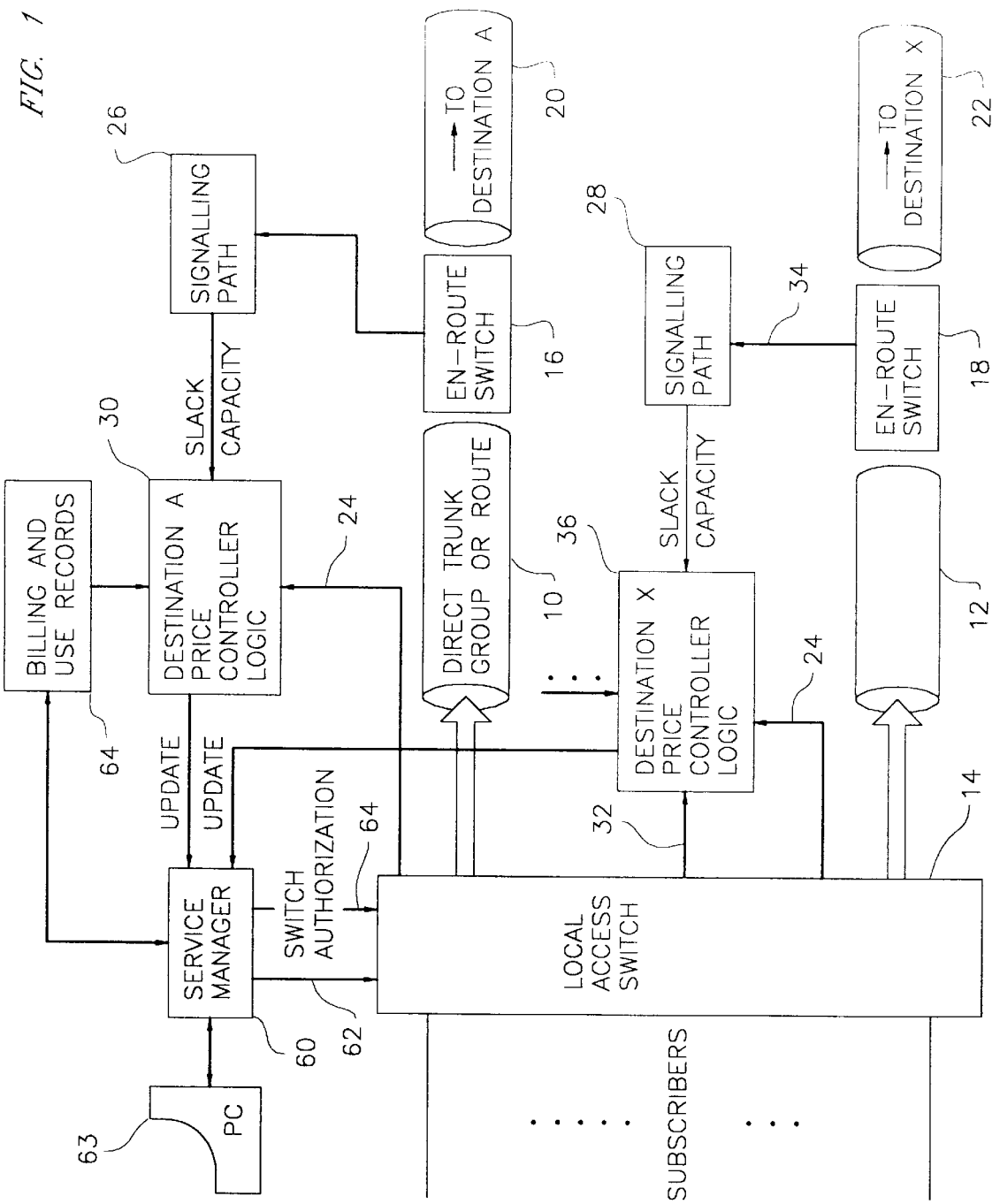
FIG. 1 is a schematic showing a local access switch and network with price controllers according to the invention.

A telecommunication traffic pricing and control system for a telecommunication network is shown in FIG. 1. The pricing and control system is applied to an existing telecommunications network that includes one or more trunk groups 10, 12 and a local access switch 14 for providing access to each trunk group 10, 12 for plural subscribers. The trunk groups 10, 12 connect with other intermediate switches 16, 18 and other trunks 20, 22 leading to call destinations A, X.

Each switch 14, 16, 18 is conventional and such switches include means to measure slack capacity on the trunk groups connected to the switches. The switches 14, 16, 18 are capable of sending a signal representative of slack capacity on the trunk groups to which the switches are connected. That signal may take the form of a signal derived from the group size and current carried load, or from group size and blocking probability.

The slack capacity signals for destination A are provided as an input along lines 24, 26 to a price controller 30. The slack capacity signals for destination X are provided as an input along lines 32, 34 to price controller 36. Other destinations may be provided with their own price controllers, each receiving slack capacity signals from the local access switch 14.

The price controllers 30, 36 generate a price to subscribers for use of the slack capacity by delay tolerant calls in a manner to be described. The pricing strategy of the price controllers 30, 36 preferably seeks to maximize revenue for the network operator. This pricing strategy may be implemented in several ways, as for example based on a theoretical or empirically based time dependent demand and supply model. However, this strategy presupposes knowledge of the demand curve, and this is unlikely to be known. A preferable model is to continuously update the price according to recent changes in the price and demand and expected demand changes for that time of day.

The price, once set is published, or made available to subscriber agents 40, 42 at subscriber locations 44, 46 respectively. Each subscriber location 44, 46 includes the agent itself. The agent may be a computer programmed to carry out the functions described in this patent document. The subscriber location 44, 46 also includes conventional data communications equipment for communicating with the local access switch 14 and a storage means 48, 50 for storing a delay tolerant message pending connection to the network (this may be a hard drive forming part of the computer) through lines 61, 63. The lines 61, 63 and other dashed lines represent lines connecting subscriber communication equipment to the trunk groups 12 through local access switch 14. Various connections may be made according to the type of equipment being used, the configuration of the switch and the network configuration.

Figure 2:
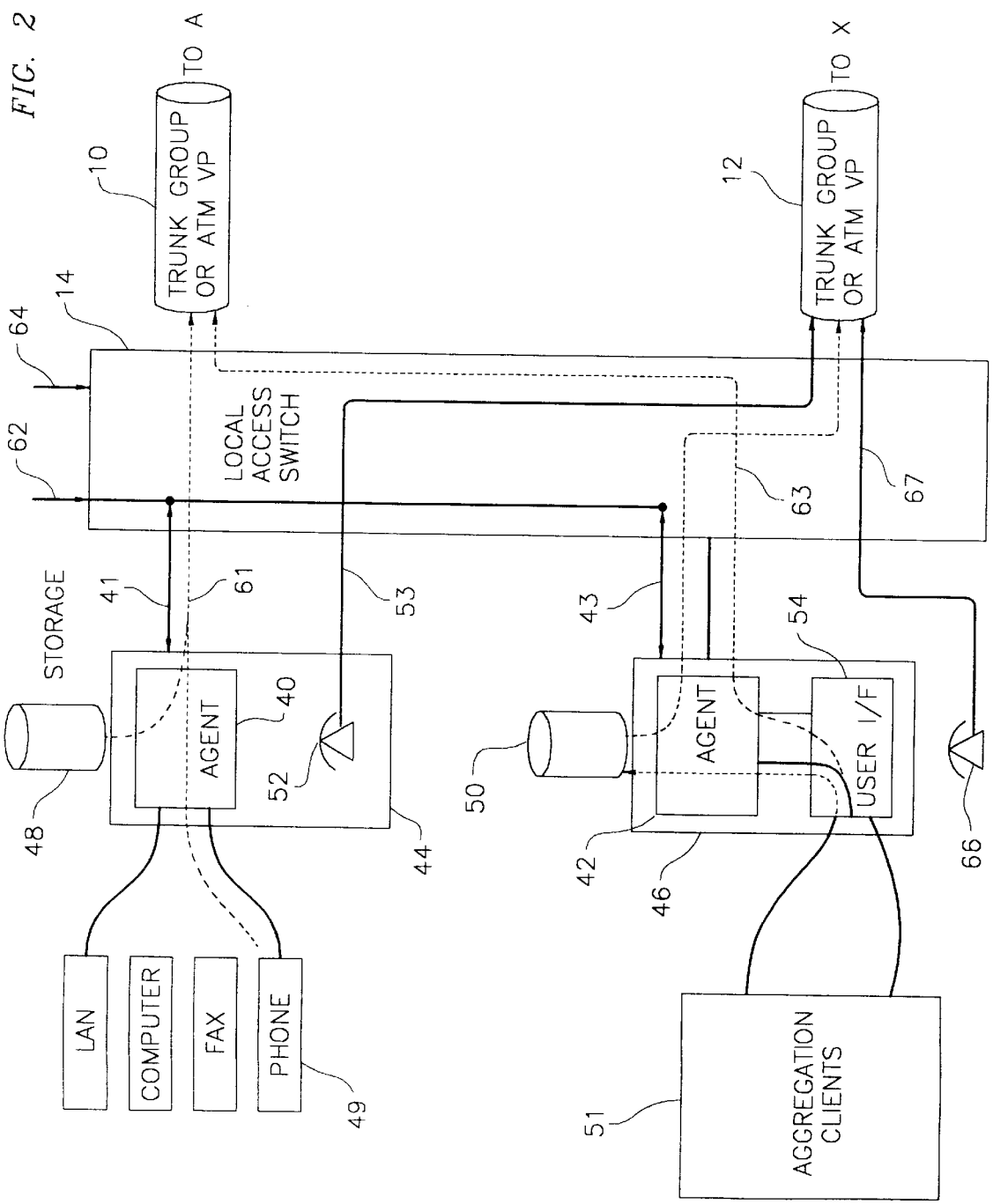
FIG. 2 is a schematic showing the local access switch of FIG. 1 with subscriber agents according to the invention.

Subscriber agent 44 is a single subscriber and has a standard telephone 52 for regular connection to the network through line 53. Subscriber agent 46 is an aggregrator service bureau connected via a user interface 54 to several subscribers, who each may have their own agent. The local connections between an aggregator agent 46 and its subscribers may themselves be established by dialup connections to the aggregator 46 from its clients made through the same local access switch 14. The effect is still as shown in FIGS. 1 and 2, however, and this possibility is not overlaid on the figure to avoid unnecessary further complexity in the drawing.

The subscriber agents 40, 42 are responsive to the price set by the price controller and generate a request for service to the local access switch 14 through lines 41, 43 for a delay tolerant call when the price for the delay tolerant call meets conditions satisfactory to the subscriber. The conditions under which the subscriber will request service are specified by the subscriber and stored in the agent's computer. Upon deciding to request service, the agent 42, 44 sends a request for service signal to the service manager 60 via line 62. The service manager 60 logs the call, authorizes the local access switch 14 via line 64 to make the desired connection and sends a signal to the account manager 64 to later generate a billing for the subscriber.

The subscriber aggregrator 46 logs all delay-tolerant service requests from its pool of subtending users. For some applications the aggregator 46 may have means to alert the intended user when the desired network slack capacity is available or ready, leaving the payload stored with the source or to be generated then by the source. In a medium or large business the agent/aggregator 44, 46 may be interfaced to subscriber equipment 49, 51 which may include one or more LANs, file servers, PBXes, FAX machines, telephones or other communications devices through which user-designated service-delay-tolerant data, video, voicemail, e-mail, fax, and even low priority voice call requests may be collected and summarized by totals intended for respective destinations. Users retain the ability to make ordinary on-demand use of the switched network as needed as for example using telephone 52.

The conventional data communications equipment at the subscriber agent 44, 46 may be a conventional ISDN or ATM network access facility, analogous to the C.O. trunks on a PBX today. The basic rate ISDN interface provides two B channels and one D channel to the user. Each B channel has a bandwidth of 64 kbps and can be used by the user to transmit both voice and data. The D channel has a bandwidth of 16 kbps and is used to carry signaling information for the B channels. The D channel gives an opportunity for direct interaction between the user and the telecommunication network through the local access switch 14. The agent 44, 46 is logically connected via the ISDN D channel (or on a designated ATM VCI) and the local access switch 14, to the service manager 60 and regularly receives a list of current prices (per unit time) for each destination on which the background transport service is offered. When the agent 44, 46 decides that a particular price meets the objective of its user strategy, the agent 44, 46 signals the service manager 60 of its agreement to pay at the current offered rate to the required destination, and forwards the connections set up data. The service manager 60 then sets up the connection and begins charging the agent 44, 46 for the time used in the current pricing intervals at the agreed price. The price from the price controller 30 is updated at update intervals, at which the network can adjust the price offering. The service manager 60 may override the price from the price controller 30 and raise the price back to full tariff at any time. The agent 44, 46 may also cancel the connection at any time at its discretion. The service manager 60 also reserves the right to terminate (and stop charging for) any background connection in progress, if essential to protect the foreground g.o.s. The user agent 44, 46 may revisit its decision for any connection that is ongoing into the next price update period, if the price changes.

The strategy of the subscriber agent 44, 46 is selected by the subscriber, and may be a simple strategy such as: Send payload X only when price is less than Y. Various strategies would be available to the subscriber that may be implemented in software in the agent's computer.

The subscriber agent 44, 46 may also be integrated with a PBX with signalling between network and customer agents on the ISDN D channel with user-to-network type packets or, in an ATM context, a virtual channel can be established with agent-network interactions supported by Q.931 signalling. The aggregrator 46 may serve groups of medium and small businesses and perhaps some residential users by logging all their access requests and implementing a decision strategy on their collective behalf for participation in the slack capacity market pool.

The system as shown in FIG. 1, and FIG. 2 allows the following activities to occur simultaneously. A subscriber 66 (for example a small company) may make a conventional on-demand connection to destination X through line 67 while the same subscribers' agent 44 simultaneously receives background service price updates to destinations via the permanent logical connection to the service manager 60 at the local access switch 14 and at the same time a variably priced connection to destination A is in progress for a local user through agent 44.

Aggregator agent 46 serves a variably priced connection to destination x through to one of its client subscribers, while at the same time it receives and stores at storage 50 (for example) a number of fax transmissions from another aggregator client to be lodged with the aggregator agent for later dispatch according to the aggregator's price-acceptance and dispatch management strategy.

There are two basic types of service that the subscriber agent 44 or an aggregator agent 46 may provide for its users or clients:

(1) a connection to the specified destination number. Such a connection passes through the user/agent interface 40, 42 when available and directly connects the user to his destination. The time of establishing the connection is not generally on demand, rather, it is determined by the time at which the networks' price offer to the destination locale is accepted by the aggregator/agents strategy or policy which may include maximum price limits set by the user when the connection request was logged with the aggregator 46 or agent 44. An example of this might be when someone wishes to have a personal video conference, or dialup onto a remote host, but the exact times of which may be flexible for the user, within certain desired price and time window constraints the user may register with the agent. Another example is an Internet Service Provider (ISP) who might log a connection request which would be used to enhance throughput for its users, if the augmentation circuit request is obtainable below a certain price. Thus, the uncertainty of getting the extra connection or not may be tolerable if the average effect is an improvement perceived by the ISPs clients. Conversely the ISP may increase what it is willing to pay for the extra connection if it senses its own "busy hour".

(2) a bulk data dispatch task. The user lodges the transport request with the agent (eg, price limits, time limits, destination number, information type), and uploads the data quantities to be transmitted temporarily to the storage system 50. The quantity of data is then on-line for the agent 44 to dispatch later via the agent-network price cooperation, under the agents' autonomous decision-making. Exemplary usages include: volumes of fax or remote-site backup of large data files; image and/or video clip archiving service which responds to requests from its customers in either an immediate sending mode, or, at its clients options, in a cost-saving, delayed delivery mode; distributing newsgroup file updates or downloading large binaries for virtual reality games.

On the network side, the service manager 60 and price controller 30 are implemented in computers running at Class 4 or Class 5 switching centres. The price controllers 30, 36 receive blocking or carried traffic measurements for all trunk groups at their respective sites. Price controllers 30, 36 may preferably collect both carried load and blocking measurements from the trunk groups 10, 12 en-route for each destination. Blocking is the most sensitive measure of available capacity when loads are relatively high, but is a very weak measure of load (hence slack capacity available) when the traffic intensity is lower. Blocking can take a long time to measure accurately at low load therefore carried traffic measurements are better used when the actual blocking events over a short measurement interval are zero. If ATM networking is used, loss, delay or call admission blocking measures are provided to the price controller 30, 36. The description that follows applies to a conventional circuit-switched trunking network, but may be simply modified to apply to an ATM network. A single logical trunk group is assumed to exist between each origin-destination pair. In the more general case of tandem switched connections, the end to end blocking and carried traffic replaces the single-group measures used in the description below.

Based on the time of day, on its price-optimizing strategy, on the current intensity of on-demand foreground tariffed traffic and on the currently admitted background traffic, the price controller 30, 36 regularly updates its list of destination prices to all subscriber agents 44, 46. The price controller's objective is to find the price for each destination that will continually maximize the product of background traffic volume elicited and the price offered by the network to bring this traffic out, without jeopardizing the g.o.s. (blocking) for the foreground traffic.

The price controller 30, 36 and service manager 60 are totally in control of pricing and of admitting background offered load. In the case of a large step increase in offered demand in response to a sharp price drop, the service manager 60 need not admit all this load at once. The service manager 60 admits the price-stimulated volumes subject to a constraint on the estimated blocking on the trunk groups 10, 12 under the total (foreground and background) carried load. If the size of the price adjustments respond inversely to the apparent responsiveness of the environment in which the price controller 30, 36 finds itself, the network is not overwhelmed by a transient background load.

The price controller 30, 36 sets the price for the slack capacity in time steps, which may be measured in terms of minutes or hours. The price setting for the $i^{th}$ time-step is approached as a change in price with respect to the previous time-step. This tracking incremental change orientation has been found much more effective than attempts at rule sets that generate an absolute price value for background traffic in each interval. The rule sets which were tested to determine a new price absolutely for each epoch produced volatile price variations and a poorer approximation of the optimal price trajectory.

The rule set proposed has a small inherent instability which, if all other parameters were fixed, (and the system is not operating up against the tariff price ceiling) causes a bounded (−5%) alternating variation in price. Consequently there is always some "small-signal" exploration on the price axis of the (hidden) demand curve. Based on these exploratory price changes, an internal variable, "sensitivity" (S), is defined as follows (equation 1):

$$S_{i+1} = \frac{(V_{cs}^{i+1} - v_{cs}^{i})/V_{cs}^{i}}{(P_i - P_{i+1})/P_i}$$

where $V^i_{cs}$ is the carried background traffic volume observed in time-step i and $P_i$ is price in time-step i.. Traffic volume, V, (in circuit-seconds) is used because it is a directly measurable quantity. It is related to traffic intensity (in Erlangs) by $A=V/\Delta t$ where $\Delta t$ is the time interval over which volume V is observed. Eq. 1 is therefore of the same general form as the equation generally known in economics for the price elasticity of a commodity:

$$\eta = \left( \frac{\delta Q}{\delta P} \times \frac{P}{Q} \right) \times (-1)$$

where V=Q and the minus sign is effected by reversal of $P_i$ subscript orders in numerator and denominator. Hence $S_i$ is of the form to be a discrete approximation to elasticity. It is, however, an exact approximator of the true elasticity present only if the partial derivative of V with respect to P is what $\Delta V/\Delta P$ reflects in a given time step. In practice, the offered traffic also changes in response to time, not just price (i.e., $\delta V/\delta t$ is non-zero) and the observed $\Delta V/\Delta P$ is not solely a measure of $\delta V/\delta t$ as desired. The price controller 30, 36 may set prices according to S, -thus assuming it is an uncorrupted measure of elasticity: If $S_{i+1}$ is positive it means that the recent history of the system is of volume and price moving in opposite directions. This suggests the presence of hidden demand to be exploited (e.g., price was decreased and an increase in volume was observed). A stronger indication that price should be lowered further is if $S_{i+1}>1$ which indicates that the volume increase was more than the price decrease, which is the mark of price elasticity and yields a net increase in revenue.

However, traffic also varies significantly with time of day, regardless of price effects. There is an inevitable increase for example at, say, 9 AM, relative to 6 AM every day. By itself, S can therefore be corrupted and misleading when underlying time of day traffic variations are significant. A negative sensitivity value in the last epoch means that price and volume recently moved in the same direction. In this case, S is likely dominated by underlying traffic change effects, not price elasticity, because demand does not in practise ever increase in response to a price increase. So in these circumstances price should not be lowered even though S alone would suggest doing so. S can therefore contribute to rules for lowering price but is given less weight in times where high diurnal change is expected and if S is returning negative values. On the other hand, at times of day (or especially night) when nominal traffic is relatively stable, if the S estimate is positive and greater than 1.0, S is a fairly trustworthy indication of price elasticity and an opportunity for increased revenue in the background service subsystem by a further price reduction.

From the above considerations, it is apparent that the controller must derate the sensitivity estimate under some circumstances because S responds to time-of-day effects as well as underlying shifts in the potential for price-stimulation. On the other hand if it were known that the nominal offered traffic was stable, then S would be a reliable indicator of price elasticity. Accordingly, the control rules incorporate a coarse set of daily "time zones" as fuzzy sets on the variable t. Generic time-of-day considerations then modify the weight of the other rules that are based on the sensitivity estimate. This tends to decouple underlying diurnal cyclic effects from true elasticity effects.

Another group of rules that contribute to the price output are based on the estimated blocking of the foreground traffic on the trunk group. These rules contribute to an increase in price when the foreground blocking estimate increases while still below the target grade of service, $B_{max}$ in two successive intervals. The blocking-based rules gain strength rapidly to force the price towards full tariff, however, as the blocking level rises "close to $B_{max}$". An explicit "crisp" rule clamps the background price at a small value (for example 5%) actually above tariff as an absolute maximum price for background demand if the blocking estimate ever exceeds Bmax. The service price, in practice, may be allowed to go slightly above tariff if driven by the blocking-related rules on the principle that the background should be completely squelched (equivalently, charged the same as foreground traffic) if the blocking estimate even suggests-threatening foreground g.o.s. Note that when the background price reaches tariff, then background traffic (if any is still offered by the agents at P=1.0) is conceptually equivalent to ordinary traffic that has just arrived through a different access system.

A collection of 22 fuzzy logic rules have been developed for use in the price controller 30, 36. The variables employed and the fuzzy membership functions defined on them are summarized in Table 1. Except where noted below, membership functions which do not straddle zero were all trapezoidal in shape. Those that straddle zero are the "negligible change" sets, and they have triangular membership functions. Fuzzy set boundaries are adjusted in practice, and may be tuned to a representative training case. All rules are of the general form:

if (variable-name) is (name of a fuzzy set defined on this variable) . . . AND/OR . . . {similar terms . . . } then (name of a fuzzy set defined on $\Delta P$) as for example the following rule set:

Rule 1: If sensitivity is INCREASING and price is DECREASING then RAISE PRICE SIGNIFICANTLY.

Rule 2: If sensitivity is INCREASING and price is INCREASING then LOWER PRICE SIGNIFICANTLY.

Rule 3: If sensitivity is CONSTANT and price is INCREASING then LOWER PRICE SLIGHTLY.

Rule 4: If sensitivity is CONSTANT and price is DECREASING then RAISE PRICE SLIGHTLY.

Rule 5: If sensitivity is INCREASING and price is CONSTANT then LOWER PRICE SLIGHTLY.

Rule 6: If sensitivity is DECREASING and price is CONSTANT then RAISE PRICE SIGNIFICANTLY.

Rule 7: If sensitivity is DECREASING MEDIUM and price is INCREASING MEDIUM then HOLD PRICE.

Rule 8: If sensitivity is DECREASING SMALL and price is INCREASING SMALL the HOLD PRICE.

Rule 9: If sensitivity is DECREASING BIG and price is INCREASING BIG then HOLD PRICE.

Rule 10: If sensitivity is INCREASING MEDIUM and price is DECREASING MEDIUM then HOLD PRICE.

Rule 11: If sensitivity is INCREASING SMALL and price is DECREASING SMALL then HOLD PRICE.

Rule 12: If sensitivity is INCREASING BIG and price is DECREASING BIG then HOLD PRICE.

Rule 13: If sensitivity is INCREASING BIG and price is DECREASING MEDIUM then LOWER PRICE SLIGHTLY.

Rule 14: If sensitivity is INCREASING MEDIUM and price is DECREASING SMALL then LOWER PRICE SLIGHTLY.

Rule 15: If sensitivity is INCREASING BIG and price is DECREASING SMALL then LOWER PRICE SIGNIFICANTLY.

Rule 16: If sensitivity is DECREASING MEDIUM and price is INCREASING SMALL then RAISE PRICE SLIGHTLY.

Rule 17: If sensitivity is DECREASING BIG and price is INCREASING SMALL then RAISE PRICE SIGNIFICANTLY.

Rule 18: If sensitivity is DECREASING BIG and price is INCREASING MEDIUM then RAISE PRICE SLIGHTLY.

Rule 19: If sensivity is CONSTANT and price is CONSTANT then HOLD PRICE.

Rule 20: If price is ABOVE TARIFF then LOWER PRICE SIGNIFICANTLY.

When blocking increases, this pricing strategy, as implemented by the price controller, tends to increase price over that suggested by the latency change. Additional rules to provide price changes in response to blocking changes may then be used:

Rule 21: If blocking is INCREASING then RAISE PRICE SIGNIFICANTLY.

Rule 22: If blocking is DECREASING then LOWER PRICE SIGNIFICANTLY.

To avoid blocking increasing too much, the price may be raised whenever blocking increases beyond a set amount for example 1%.

When the weight of all rules are evaluated, the degree of membership in each fuzzy set defined on the output variable P is established. To make the output price change suitably responsive and capable of a wide range of output price step changes, a monotonic increasing-only output membership functions may be used, except for HOLD PRICE, which is triangular about zero price change.

In a model of the plan, results shown in Table II were obtained. Table II shows that the FL price controller consistently outperformed the tariff-only pricing strategy by 13 to 14%, based on a model with $\alpha=-0.3$ and $2<L<7$, where $\alpha$ is a measure of the shape of the hidden curve relating total demand to price, such that demand, D, equals $1-\alpha P-\alpha P^2$ . . . $0<P<1$ and L is the latency factor, which represents the upper limit to demand stimulation, relative to the foreground only traffic, if price were brought to the zero limit. Separately, Table III shows a 43% increase in the theoretical maximum (total) earnings as $\alpha$ goes from $-1$ to $+1$ and shows that the fuzzy logic price controller 30, 36 yielded revenue gains over tariff-only operations of 4.2% at $\alpha=-1$ up to 20.7% in the most optimistic case of $\alpha=1$. Note, however, that while the fuzzy logic price controller 30, 36 improves performance relative to fixed pricing as $\alpha$ increases, the performance relative to the optimum for attainable revenue seems to deteriorate: While the absolute earnings go on increasing with $\alpha$, the percentage of theoretical revenue achieved drops by about 9% (from 89.93 to 80.61%) as the economic conditions for stimulation grow more favourable. Detailed inspection of the simulation cases for Table III showed that this is largely due to some blocking implications which the FL controller takes into account which the analytical model for $P_{opt}$ does not reflect. The price controller 30, 36 has the objective of maximizing revenue while keeping the estimated foreground blocking levels under $B_{max}$ (0.02 in these simulations). However, while the optimum price benchmark calculation has P<1 built in to it, it has no inherent constraint regarding P(B) and can recommend pricing that corresponds to stimulation of stimulated traffic which would indeed exceed $B_{max}$. This is largely why the fuzzy logic price controller 30, 36 performance appears to degrade in the cases of high $\alpha$, because $P_{opt}$ can range low enough to overstimulate from a blocking viewpoint, while still being optimal solely from a revenue viewpoint. But these high theoretical levels of stimulation are areas where the price controller 30, 36 will not follow, as it is backing off, watching for the foreground blocking implications. In fact this departure of the price controller simulation and the purely economic optimum pricing, demonstrates that the controller will forfeit some theoretically achievable background revenue to operate without degrading foreground g.o.s. In fact, in the case of $\alpha=1$, inspection showed that the purely revenue-optimal price strategy can generate peak offered traffic demand points that would cause as much as 22% blocking, if it was allowed. This confirms the need in practise to explicitly constrain the working domain of the controller in both P<1 and $P(B)<B_{max}$ senses, as in the exemplary price controller 30, 36 described.

In calculating revenue optimization, lost revenue from traffic displacement should be accounted for wherein some degree of displacement would occur from the foreground tariff-calling service to the background delay-tolerant service mode. This might occur particularly if the network guaranteed the price for a predefined multi interval period. This would, however, be more complicated for the price controller 30, 36, in terms of not jeopardizing foreground g.o.s. and optimizing the price setting.

When latent demand and demand curve conditions cannot support a revenue gain the price controller 30, 36 offers no price reductions and the whole system effectively merges with the foreground tariff-priced operations. Only when the controller senses exploitable volumes of latent delay-tolerant demand, in conjunction with its own slack capacity to carry that demand does it discount the pricing to bring forward volumes of paying traffic on otherwise lightly loaded facilities. The aim of the controller will be to continually approximate the revenue-maximization point on the hidden demand curve for background capacity.

Unlike schemes for variable pricing and fixed telephoned tariff discounts, the price control of the present invention does not vary price for all subscribers as a means to limit demand to maintain a target blocking level. The subscribers may pay a subscription fee to join in the "market" for the surplus transport capacity and then use pricing to stimulate, not limit, traffic, creating a "surplus capacity market". The new mode of access also serves only delay-tolerant and suspendible applications. Note that by delay tolerant here, is meant delay in receiving service. This is not the same as tolerance to delay variance which the same words usually refers to in ATM.

Finally, the service manager 60 may be controlled with a computer, such as a personal computer 63, to offer special price promotions, and feedback from the service manager 60 may provide service volumes and pricing back to the computer 62 for monitoring of the service.

A person skilled in the art could make immaterial modifications to the invention described in this patent document without departing from the essence of the invention that is intended to be covered by the scope of the claims that follow.

TABLE I

Variables and Fuzzy Sets Employed

| Variable | Description | Fuzzy Sets on Variable Domain |
|---|---|---|
| $S_i$ | sensitivity (Eq.(15)) | "negative big, medium", small", negligible change", and positive mirror-image sets |
| $P(B)_i$ | measured foreground-blocking | "very low","OK","close to $B_{max}$" |
| $\Delta P(B)$ | $P(B)_i - P(B)_{i-1}$ | "decreasing","increasing" |
| $\Delta P_{i-1}$ $\Delta P_i$ | last two price changes, respectively | "increased/decreased {significantly, medium, . . . slightly}" and "negligible change" |
| $t_i$ | time of day | "night","early AM","morning", "mid-day", "PM","late PM", "evening" |
| $P_i$ | Background price (per unit time to specific destination) | "very low","moderate","near tarrif","virtually at tariff" |

TABLE II

Total revenue as a percent of theoretical maximum for randomized 3-day simulations ($\alpha = -0.3, 2 < L < 7$, $A_{of}(t)$ = training case +/− 30% randomization)

| | Price fixed at Tariff | F.L. Controller |
|---|---|---|
| Case 1 | 73.81% | 87.85% |
| Case 2 | 74.28% | 89.61% |
| Case 3 | 74.06% | 86.96% |
| Case 4 | 73.94% | 86.51% |
| Case 5 | 73.98% | 89.50% |

TABLE III

Total revenues as a percent of theoretical maximums for the 3-day simulation case with varying $\alpha$

| $\alpha$, shape of D(P) | Price fixed at tariff | F.L. Controller | Total revenue at Optimum Price (relative to $\alpha = -1$) |
|---|---|---|---|
| $\alpha = -1$ | 85.76% | 89.83% | 1.0 |
| $\alpha = -0.5$ | 76.98% | 88.78% | 1.114 |
| $\alpha = 0$ | 69.82% | 87.58% | 1.228 |
| $\alpha = 0.5$ | 64.28% | 83.74% | 1.334 |
| $\alpha = 1$ | 59.87% | 80.61% | 1.432 |

The embodiments of the invention in which an exclusive property or privilege is claimed are defined as follows:

1. A telecommunication traffic pricing and control system for a telecommunication network that includes at least one trunk group and a local access switch for providing access to each trunk group for plural subscribers, the telecommunication traffic pricing and control system comprising:

means to measure slack capacity on the trunk group and provide a signal representative of slack capacity on the trunk group;

a price controller having as input the slack capacity signal for generating a price to subscribers for use of the slack capacity by delay tolerant calls, in which the price controller is programmed to implement a pricing strategy that is dependent on past changes in telecommunications traffic volume on the trunk group and past changes in price of delay tolerant calls; and a first subscriber agent responsive to the price set by the price controller for generating a request for service to the local access switch for a delay tolerant call when the price for the delay tolerant call meets conditions set by the subscriber.

2. The telecommunication traffic pricing and control system of claim 1 in which the price controller is programmed to implement a set of fuzzy logic, neural network, or expect system rules.

3. The telecommunication traffic pricing and control system of claim 1 in which the subscriber agent includes a user interface and further including:

plural other subscriber agents connected to provide delay tolerant data to the first subscriber agent.

4. The telecommunication traffic pricing and control system of claim 1 in which the subscriber agent has associated with it a storage system for the storage of delay tolerant calls.

5. The telecommunications traffic pricing and control system of claim 1 in which the price controller is programmed to implement a pricing strategy with reference to price elasticity of delay tolerant calls on the telecommunications network.

* * * * *